United States Patent [19]

Krynock

[11] Patent Number: 5,249,859

[45] Date of Patent: Oct. 5, 1993

[54] VIBRATORY BLENDER/CONVEYOR

[75] Inventor: Robert A. Krynock, Indiana, Pa.

[73] Assignee: FMC Corporation, Chicago, Ill.

[21] Appl. No.: 958,375

[22] Filed: Oct. 8, 1992

[51] Int. Cl.⁵ ............................................. B01F 11/00
[52] U.S. Cl. .................................. 366/109; 198/771
[58] Field of Search ............... 366/31, 32, 108, 109, 366/111, 114, 219, 336, 337, 338; 198/771

[56] References Cited

U.S. PATENT DOCUMENTS

| | | | |
|---|---|---|---|
| 2,336,561 | 12/1943 | Muskat | 198/771 |
| 3,083,411 | 4/1963 | Glass | 366/111 X |
| 3,086,008 | 4/1963 | Opila et al. | 198/771 X |
| 3,195,713 | 7/1965 | Morris et al. | 198/771 X |
| 3,297,304 | 1/1967 | Wahl | 366/109 |
| 3,318,446 | 5/1967 | Grow | 366/109 X |
| 3,338,385 | 8/1967 | Sage | 198/771 |
| 3,504,783 | 4/1970 | Kuschnereit | 366/108 X |
| 3,524,533 | 8/1970 | Miller et al. | 198/771 X |
| 4,339,027 | 7/1982 | Lauer | 198/771 X |

FOREIGN PATENT DOCUMENTS

| | | | |
|---|---|---|---|
| 847878 | 8/1952 | Fed. Rep. of Germany | 198/771 |
| 2325254 | 3/1975 | Fed. Rep. of Germany | 198/771 |
| 1951541 | 11/1977 | Fed. Rep. of Germany | 198/771 |
| 55-52806 | 4/1980 | Japan | 198/771 |
| 1105221 | 7/1984 | U.S.S.R. | 366/108 |
| 1136834 | 1/1985 | U.S.S.R. | 366/108 |
| 1162472 | 6/1985 | U.S.S.R. | 366/114 |
| 1329808 | 8/1987 | U.S.S.R. | 366/108 |
| 309752 | of 1912 | United Kingdom | 198/771 |

Primary Examiner—Harvey C. Hornsby
Assistant Examiner—Charles Cooley
Attorney, Agent, or Firm—Henry C. Query, Jr.; Richard B. Megley

[57] ABSTRACT

A device for blending and conveying materials which comprises an elongated trough having an inlet end, a discharge end, and two spaced apart side walls; an apparatus for vibrating the trough; a first blending apparatus connected to the trough between the inlet end and the discharge end including a first lift located adjacent one of the side walls for elevating a first proportion of materials and a second lift located adjacent the other side wall for elevating a second proportion of materials, wherein each lift comprises a ramp connected to a generally horizontal platform; and first and second diverters connected to the first and second lifts, respectively, for folding the first and second proportions of materials over onto a third proportion of materials being conveyed along the trough between the first and second lifts.

6 Claims, 3 Drawing Sheets

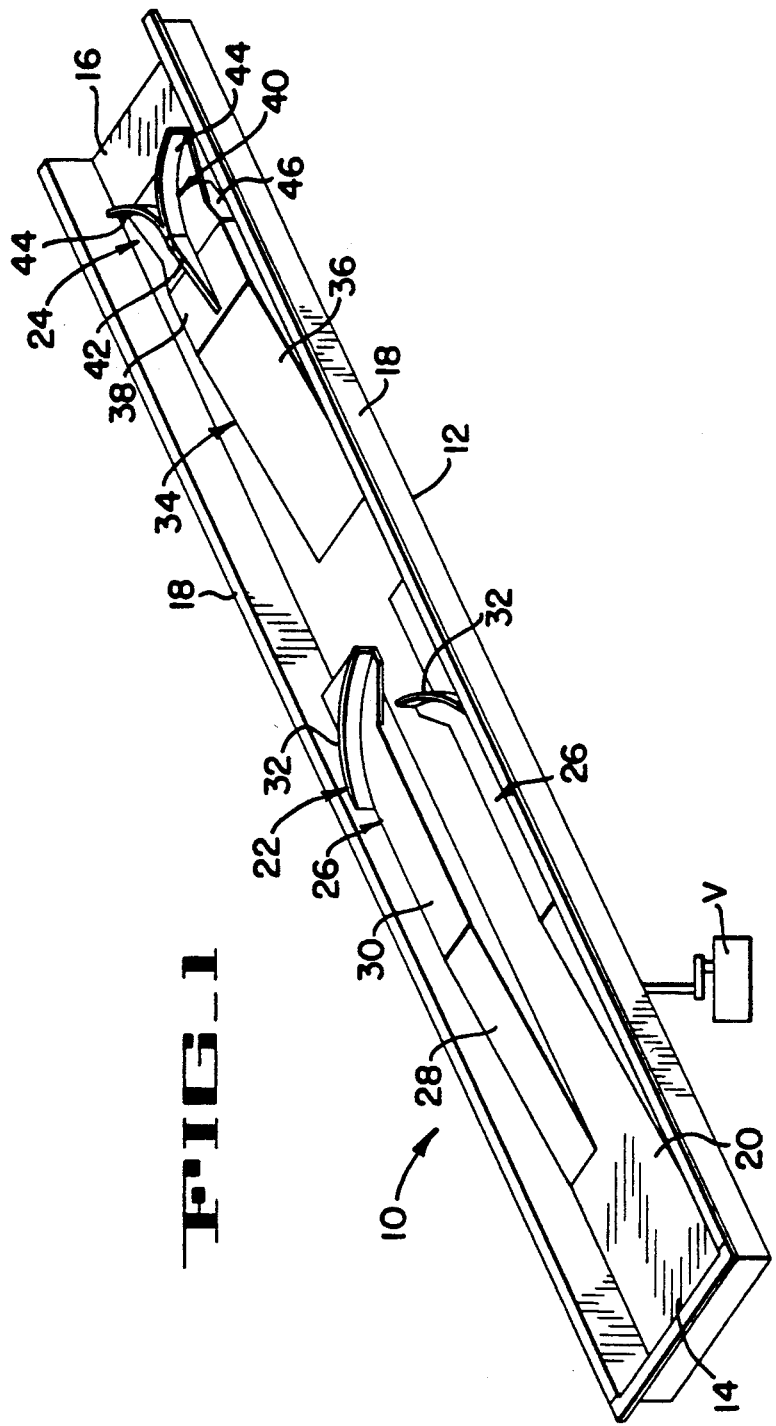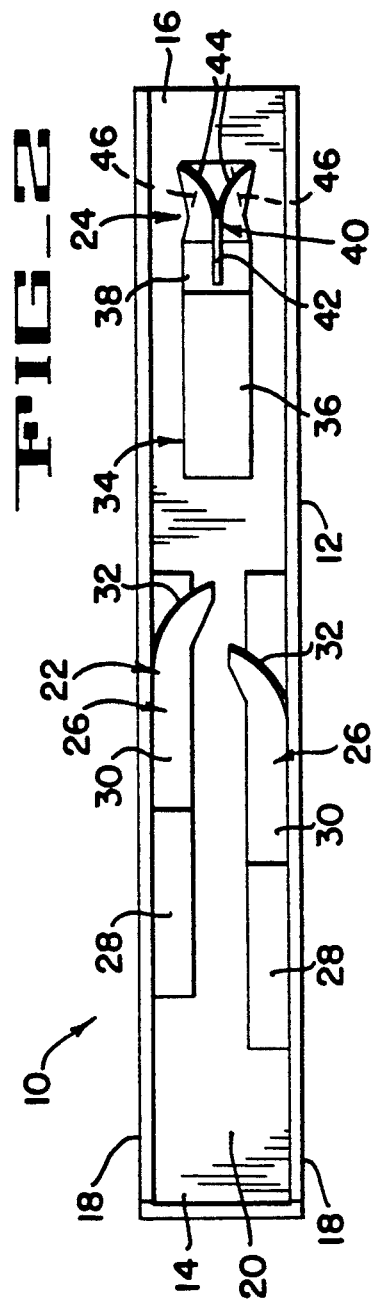

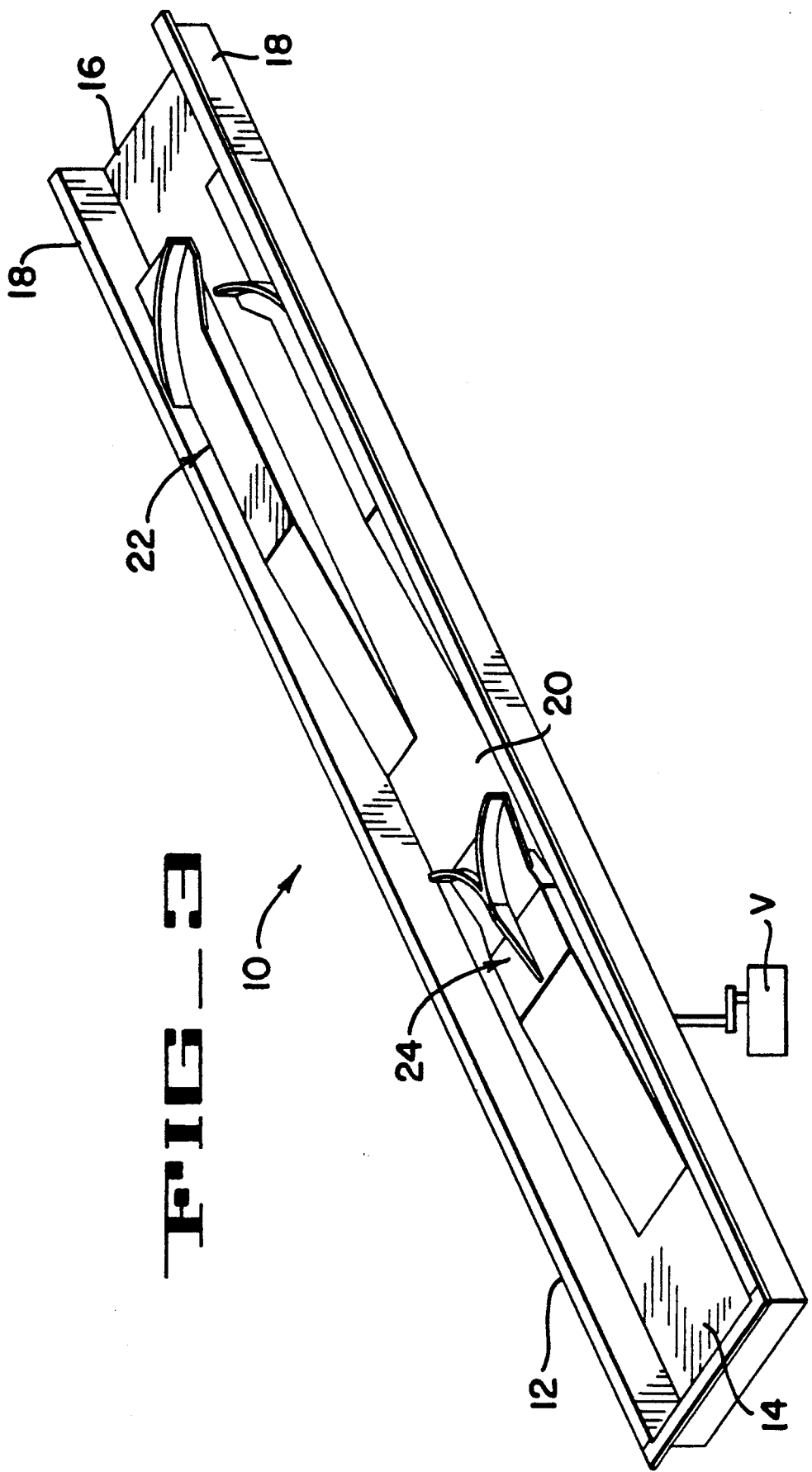

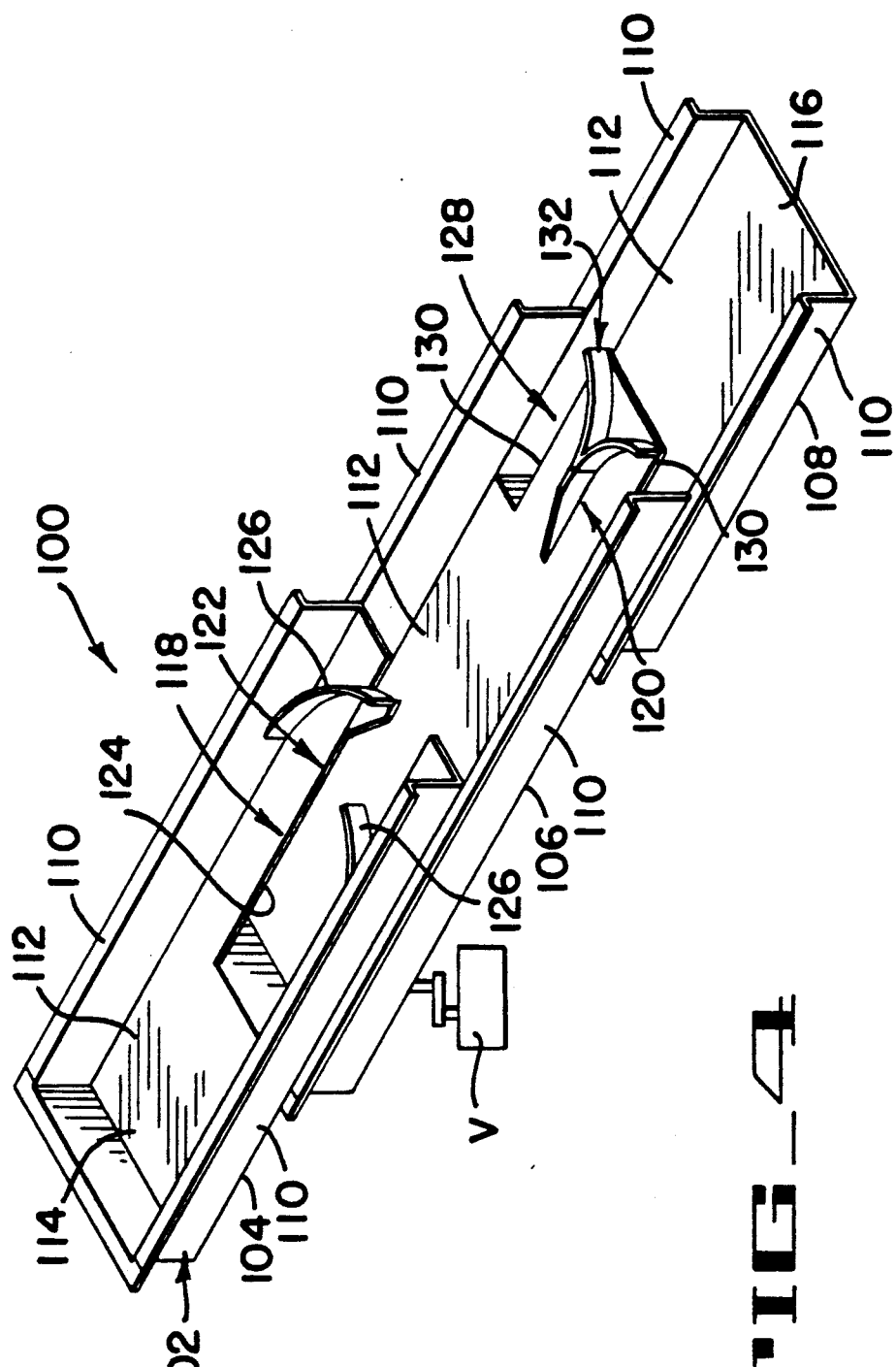
FIG_4

VIBRATORY BLENDER/CONVEYOR

FIELD OF THE INVENTION

This invention relates to devices for conveying and blending two or more materials. More particularly, the invention relates to a vibratory conveyor which also includes means to blend the materials together as they are being conveyed.

BACKGROUND OF THE INVENTION

The use of vibratory conveyors to transport materials along a production line is well known. Typically, the materials are deposited at one end of an elongated trough which is vibrated by well known means. The force of the vibrations causes the materials to travel down the length of the trough and out an opening in the end, where they are deposited at another station in the production line.

In many applications two different materials are required to be uniformly blended during the production process. For example, in the production of many cold cereals, flakes must be blended with fruits or nuts to yield a homogeneous product. This blending process is usually performed by a blender at another location in the production line. It is desirable to combine the blending and conveying operations to eliminate excessive equipment and thereby shorten the production line and reduce both the equipment costs and the costs of production.

SUMMARY OF THE INVENTION

Therefore, it is an object of the present invention to provide a device which can perform both the blending and conveying operations in a single step. It is another object of the invention to provide such a device which can uniformly blend two or more materials together to produce a homogeneous or nearly homogeneous end product.

According to the present invention, these and other objects and advantages are achieved by providing a combination vibratory blender/conveyor comprising an elongated trough having an inlet end and a discharge end, rear blending means and forward blending means. The materials to be conveyed and blended are deposited in the appropriately desired proportions at the inlet of the trough. The trough is vibrated by external vibratory means and the vibrations cause the materials to travel from the inlet downstream through the rear blending means and then the forward blending means.

The rear blending means comprises at least one lift means for both slowing and vertically separating a proportion of the materials being conveyed from the remaining proportion and diverter means for folding the separated proportion of materials over the remaining proportion of materials. Preferably, the rear blending means comprises two lift means, one located at each side of the trough, and a diverter means associated with each lift means so that the materials travelling along the sides of the trough will be elevated and folded over materials travelling down the center of the trough. In addition, each diverter preferably extends toward the center of the trough so that the materials travelling along one side of the trough will be deposited toward the other side of the trough.

The forward blending means also comprises a lift means for both slowing and vertically separating a proportion of the materials being conveyed along the trough from the remaining proportion and diverter means for diverting the separated proportion onto the remaining proportion. Preferably, the forward blending means comprises a single lift means located at the center of the trough and the diverter means diverts the separated materials onto the remaining materials being conveyed along the sides of the trough in approximately equal proportions. In addition, the forward blending means is located a sufficient distance from the discharge to allow the blended product to disperse over the entire width of the trough before being discharged.

Thus, a proportion of the materials being conveyed down the trough is slowed down and folded in over the remaining proportion of materials by the rear blending means, and then a proportion of this mixture is slowed down and folded over the remaining proportion by the forward blending means to thoroughly blend the materials together and thereby create a homogeneous mixture.

These and other objects and advantages of the present invention will be made apparent from the following detailed description, with reference to the accompanying drawings.

BRIEF DESCRIPTION OF THE DRAWINGS

FIG. 1 is a perspective view of the blender/conveyor of the present invention,

FIG. 2 is a top view of the blender/conveyor depicted in FIG. 1;

FIG. 3 is a perspective view of another embodiment of the blender/conveyor of the present invention; and FIG. 4 is a perspective view of yet another embodiment of the blender/conveyor of the present invention.

DETAILED DESCRIPTION OF THE PREFERRED EMBODIMENTS

Referring to FIGS. 1 and 2, the vibratory blender/conveyor of the present invention, indicated generally by reference number 10, comprises an elongated trough 12 having an inlet end 14, a discharge end 16, two sides 18, and a bottom 20. Trough 12 is connected to a supporting frame (not shown) and located at an appropriate position in a material processing or packaging production line. In a manner well known in the art, conventional vibratory means, generally V, are linked to trough 12 to impart vibratory forces to trough 12. Materials to be conveyed and blended are introduced at inlet 14 and are conveyed by means of the vibrations downstream toward discharge 16.

As the materials are conveyed from inlet 14 toward discharge 16, they pass through a first or rear blending means, indicated generally by reference number 22, and then, preferably, a second or forward blending means 24, indicated generally by reference number 24. In a preferred embodiment, rear blending means 22 comprises two lift means 26, one located adjacent each side 18 of trough 12. Each lift means 26 comprises a ramp 28 and a platform 30. Ramp 28 can have any appropriate slope, but in the preferred embodiment has a slope of approximately five degrees. Each lift means 26 is approximately one quarter the width of trough 12 so that as the materials to be blended pass through rear blending means 22, approximately one half of the materials will engage both lift means 26. As the materials are conveyed through rear blending means 22, the materials at the sides of trough 12, comprising approximately one half of the materials being conveyed, are lifted by ramps 28 off of floor 20 and onto platforms 30. Thus, lift means 26 serve to both slow down the proportion of materials being conveyed along the sides of trough 12 and vertically separate that proportion from the remaining proportion of materials being conveyed along the center of trough 12. Also, as can best be seen in FIG. 2, platforms 30 preferably have different lengths, and ramps 28 therefore begin at different points along trough 12. This serves to stagger the proportions of materials travelling over the respective lift means 26.

Rear blending means 22 further comprises diverter means 32 mounted on the downstream end of each platform 30. Diverter means 32 are preferably constructed of arcuate strips of a strong material and serve to fold or direct the separated proportions of materials being conveyed along platforms 30 onto the remaining proportion of materials being conveyed along bottom 20 at the center of trough 12 to thereby combine the separated and remaining proportions. As can best be seen in FIG. 2, each diverter means 32 extends beyond the edge of the respective ramp 30 to which it is attached. In addition, one diverter means 32 is mounted farther downstream than the cother diverter means 32. Thus, that proportion of the materials being conveyed along one platform 30 will be folded onto the proportion of the materials being conveyed along bottom 20 adjacent the other platform 30, and vice-versa.

After the materials pass through rear blending means 22, they are directed toward forward blending means 24. Forward blending means 24 comprises a lift means 34, which in turn comprises a ramp 36 and a platform 38. Ramp 36 can have any appropriate slope, but in the preferred embodiment, ramp 36 has a slope of approximately five degrees. Lift means 34 is approximately one half the width of trough 12 and is located along the longitudinal axis of trough 12. As the materials are being conveyed through forward blending means 24, the materials travelling along the center of trough 12, comprising approximately half of the materials being conveyed, are lifted off of floor 20 by ramp 36 and onto platform 38. Thus, lifting means 34 functions to slow down that proportion of the materials travelling along the center of trough 12 and vertically separate that proportion from the remaining proportion of materials being conveyed along bottom 20 at the sides of trough 12.

Forward blending means 24 further comprises a diverter means 40 mounted on the downstream portion of platform 38. Diverter means 40 comprises a separator 42 and two arcuate strips 44 which, together with separator 42, have approximately a "Y" configuration. Diverter means 40 serves to divide the separated proportion of materials being conveyed on platform 38 and divert or fold each half of that proportion onto the adjacent remaining proportions being conveyed along bottom 20 at the sides of trough 12 to thereby combine the separated and remaining proportions. The sides of forward blending means 24 below platform 38 are recessed as at 46 to help prevent the materials being conveyed from becoming jammed between the sides of forward blending means 24 and sides 18 of trough 12. In addition, forward blending means 24 is spaced sufficiently upstream of discharge 16 so that the materials can disperse over the entire width of trough 12 before exiting trough 12 through discharge 16.

In operation, the materials to be conveyed and blended are deposited at inlet end 14 of trough 12. The vibrations acting on trough 12 cause the materials to be conveyed downstream toward rear blending means 22. As the materials pass through rear blending means 22, approximately one half of the materials travelling along both sides of trough 12 are slowed and vertically separated from the remaining proportion of materials travelling along the center of trough 12 by lift means 26. Diverter means 32 on each lift means 26 then folds the separated proportion of materials over the remaining proportion of materials being conveyed along bottom 20 at the center of trough 12. The blended materials are then conveyed toward forward blending means 24, where approximately half the materials travelling along the center of trough 12 is slowed and vertically separated from the remaining proportion of materials travelling along the sides of trough 12 by lift means 34. Diverter means 40 then folds the separated proportion of materials over the remaining proportions of materials being conveyed along bottom 20 at the sides of trough 12. Rear blending means 22 and forward blending means 24 thus thoroughly blend the materials being conveyed and result in a homogeneous or nearly homogeneous product being exited through discharge 16.

In a second embodiment of the present invention, a blender/conveyor 10 is provided with only a single blending means. This single blending means can be similar to either the rear blending mean 22 or the forward blending means 24 described in the previous embodiment.

In a third embodiment of the present invention, depicted in FIG. 3, the blender/conveyor 10 is similar to that described in the first embodiment, except that the rear blending means 22 and the forward blending means 24 have been switched. All other aspects of the blender/conveyor of this embodiment are identical to those of the first embodiment, and a description of the same would therefore be repetitious.

In yet another embodiment of the invention, depicted in FIG. 4, blender/conveyor 100 comprises a multitiered elongated trough 102 comprising, in the embodiment depicted, three stacked trays 104, 106 and 108. Each tray 104, 106 and 108 comprises two sides 110 and a bottom 112. Trough 102 has an inlet end 114 one end of the top tray 104 and a discharge end 116 at one end of the bottom tray 108. Materials to be blended and conveyed are deposited at inlet end 114 and are transported by the force of the vibrations downstream toward discharge 116.

Blender/conveyor 100 further comprises a first or rear blending means 118 and a second or forward blending means 120. Rear blending means 118 comprises lift means 122 which, in this embodiment, consists of a slot 124 in bottom 112 of tray 104. Slot 124 is approximately half the width of tray 104, is located along the longitudinal axis of tray 104 and extends from about inlet end 114 to the downstream edge of tray 104. Slot 124 operates to vertically separate approximately half the materials being conveyed along the center of tray 104 from the remaining proportion of materials. Blending means 118 also comprises diverter means 126 mounted on bottom 112 of tray 104 at each side of slot 124. Each diverter means 126 comprises an arcuate strip which serves to fold or divert the remaining proportion of materials travelling along bottom 112 at the sides of tray 104 onto the separated proportion of materials that has fallen through slot 124 to thereby combine the separated and remaining proportions. Each diverter means 126 is preferably staggered with respect to the other along the length of tray 104 to enhance the blending process.

Forward blending means 120 is located at the downstream end of tray 106 and comprises lift means 128 which, in this embodiment, consists of two slots 130. Each slot 130 is approximately one quarter the width of tray 106, is located adjacent a side 110 of tray 106, and extends to the downstream edge of tray 106. Slots 130 operate to vertically separate approximately half the materials being conveyed along the sides of tray 106 from the remaining proportion of materials. Forward blending means 120 further comprises diverter means 132, similar to diverter means 46 of the first embodiment, which serves to divert the remaining proportion of materials travelling along the center of tray 106 onto the separated proportion of materials that have fallen through slots 130 to thereby combine the separated and remaining proportions.

In operation of blender/conveyor 100, the materials to be blended and conveyed are introduced at inlet 114 of trough 102. The vibratory forces convey the materials downstream toward rear blending means 118, where approximately half the materials travelling along the center of trough 102 are vertically separated from the remaining proportion by lift means 122 and the remaining proportion is folded over the separated proportion by diverter means 126. The blended materials are then conveyed toward forward blending means 120, where approximately half the materials travelling along the sides of trough 102 are vertically separated from the remaining proportion by lift means 128 and the remaining proportion is folded over the separated proportion by diverter means 132. The homogeneous or nearly homogeneous mixture of materials is then conveyed out discharge 116 to be processed as desired.

In further embodiments of the blender/conveyor of the present invention, blender/conveyor 100 described in the previous embodiment comprises only one of the rear blending means 118 or the forward blending means 120, or the rear blending means 118 and the forward blending means 120 are switched.

It should be recognized that, while the present invention has been described in relation to the preferred embodiments thereof, those skilled in the art may develop a wide variation of structural details without departing from the principles of the invention. Therefore, the appended claims are to be construed to cover all equivalents falling within the true scope and spirit of the invention.

What is claimed is:

1. A device for blending and conveying materials comprising:
    an elongated trough having an inlet end, a discharge end and two spaced apart side walls;
    means for vibrating the trough;
    first blending means connected to the trough between the inlet end and the discharge end for blending the materials;
    the first blending means comprising a first lift means located adjacent one of the side walls for elevating a first proportion of materials and a second lift means located adjacent the other side wall for elevating a second proportion of materials; and
    first and second diverter means connected to the first and second lift means, respectively, for folding the first and second proportions of materials over onto a third proportion of materials being conveyed along the trough between the first and second lift means;
    wherein the first and second lift means each comprise at least one ramp connected to a generally horizontal platform.

2. The device of claim 1, wherein each of the first and second diverter means is connected to the platform of the respective lift means downstream of the connection of the ramp with the platform.

3. The device of claim 2, wherein the first diverter means is located downstream of the second diverter means.

4. The device of claim 1, further comprising second blending means connected to the trough between the inlet end and the discharge end for blending the materials;
    the second blending means comprising a lift means located between the side walls for elevating a first proportion of materials;
    the width of the lift means being less than the distance between the side walls; and
    diverter means connected to the lift means for folding the first proportion of materials over onto a second and a third proportion of materials being conveyed along the trough between the lift means and the side walls.

5. A device for blending and conveying materials comprising:
    an elongated trough having an inlet end, a discharge end and two spaced apart side walls;
    means for vibrating the trough;
    a first lift comprising a ramp and a generally horizontal platform, the first lift being located adjacent one of the sidewalls;
    a second lift comprising a ramp and a generally horizontal platform, the second lift being located adjacent the other sidewall;
    a first diverter connected to the platform of the first lift and extending from the side wall adjacent the first lift toward the center of the trough;
    a second diverter connected to the platform of the second lift and extending from the side wall adjacent the second lift toward the center of the trough;
    a third lift having a width less than the distance between the side walls and comprising a ramp and a generally horizontal platform; and
    a third diverter connected to the platform of the third lift and extending from the center of the lift toward both side walls.

6. A device for blending and conveying materials comprising:
    a first elongated trough having an inlet end, a discharge end, a bottom and two spaced apart side walls;
    means for vibrating the trough;
    the bottom comprising a longitudinal, centrally aligned slot having a width less than the distance between the side walls and extending from the discharge end toward the inlet end;
    a first diverter connected to the bottom and extending from one sidewall toward the center of the slot;
    a second diverter connected to the bottom and extending from the other sidewall toward the center of the slot;
    a second elongated trough having an inlet end, a discharge end, a bottom and two spaced apart side walls;
    the inlet end of the second trough being located below the slot of the first trough and the discharge end of the second trough being located downstream of the discharge end of the first trough;

the bottom of the second trough comprising two slots, each being located adjacent a side wall and extending from the discharge end toward the inlet end of the second trough; and a third diverter connected to the bottom of the second trough between the slots and extending from the center of the second trough toward both side walls of the second trough.

* * * * *